INVENTORS
HENRY F. MILLER
THOMAS J. RHODES
BY
ROBERT J. PATTERSON
ATTORNEY.

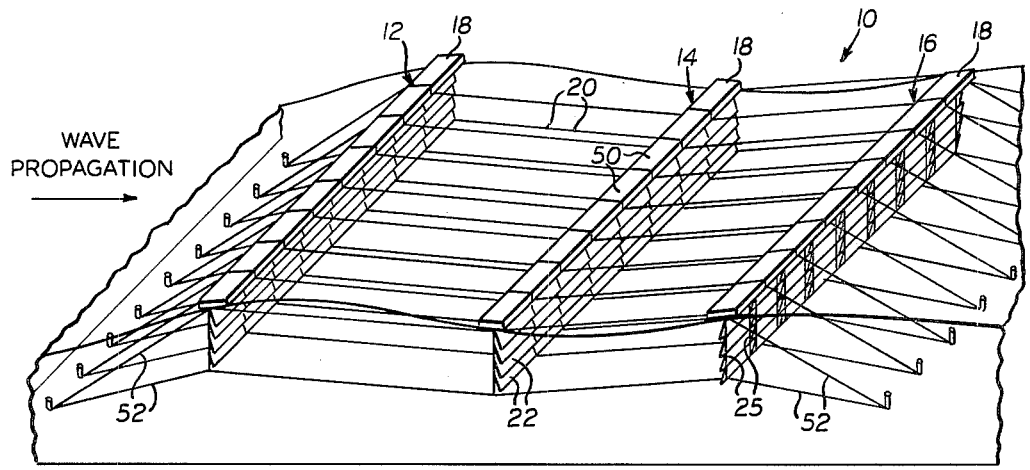
FIG. 1.
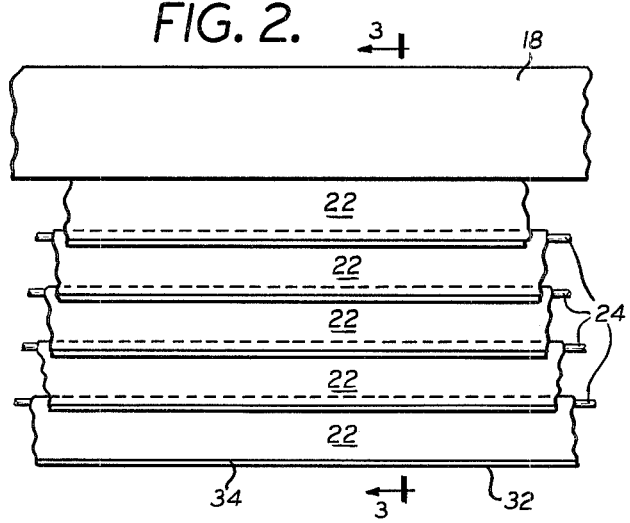
FIG. 2.
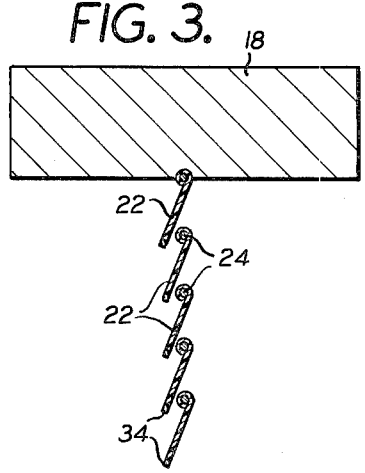
FIG. 3.
FIG. 3A.
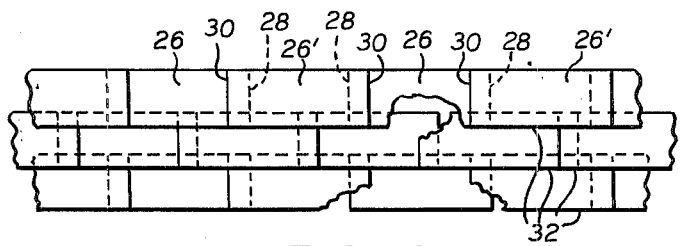
FIG. 4.

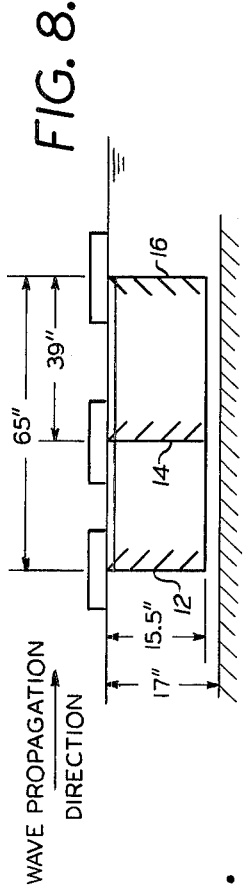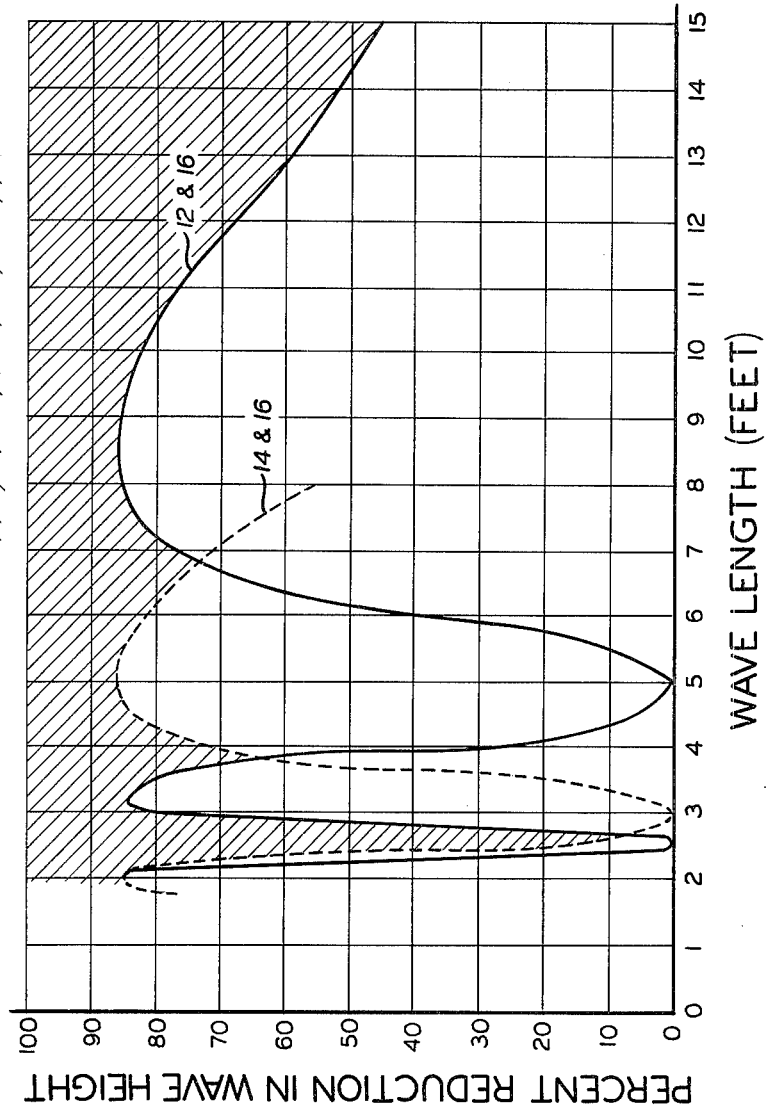

Dec. 14, 1965   H. F. MILLER ETAL   3,222,870
WAVE DAMPING APPARATUS
Filed March 12, 1962   7 Sheets-Sheet 5
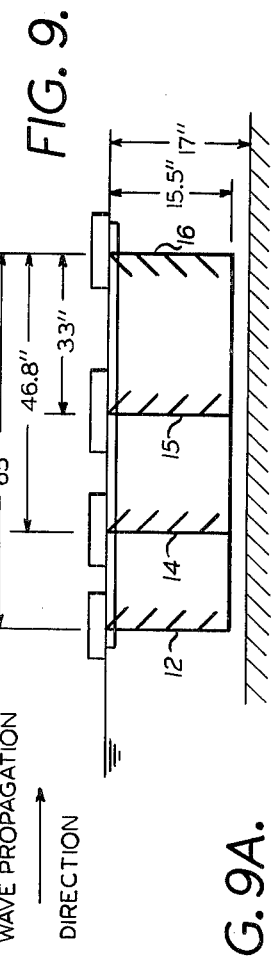
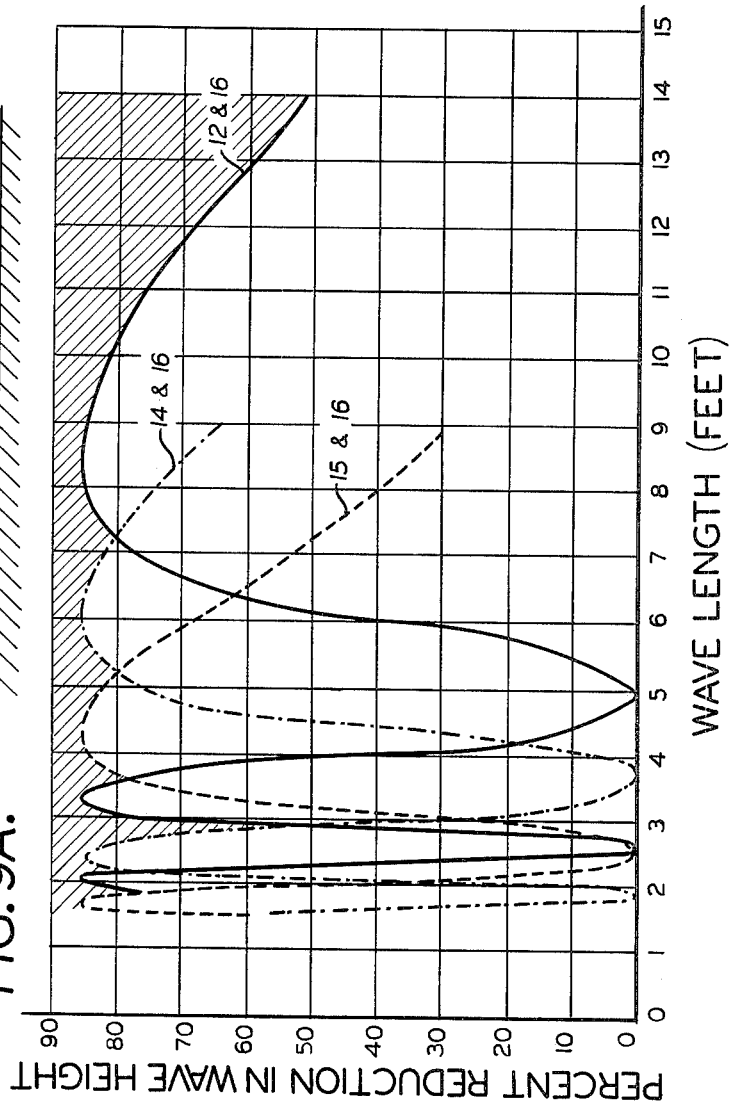
INVENTORS
HENRY F. MILLER
THOMAS J. RHODES
BY
ROBERT J. PATTERSON
ATTORNEY.

Dec. 14, 1965     H. F. MILLER ETAL     3,222,870
WAVE DAMPING APPARATUS
Filed March 12, 1962          7 Sheets-Sheet 6
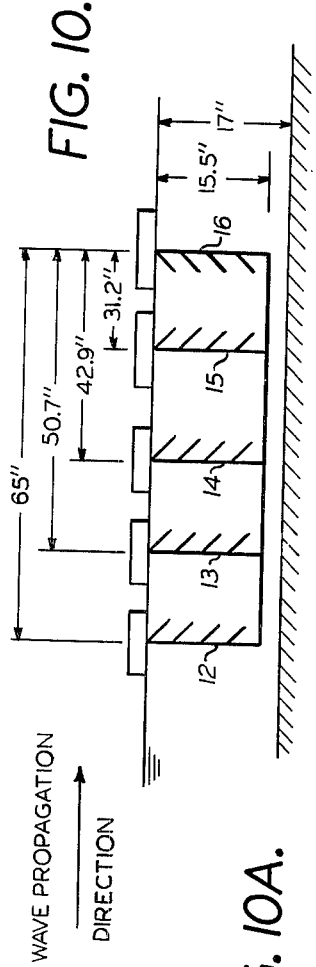
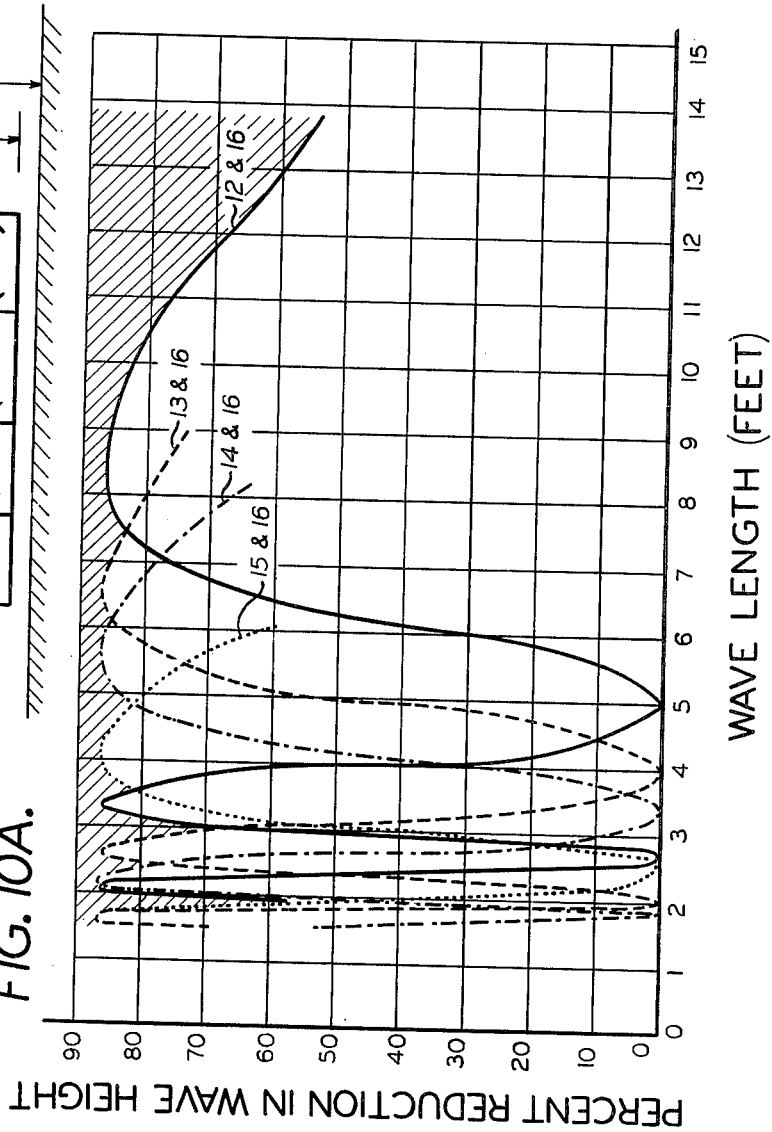
INVENTORS
HENRY F. MILLER
THOMAS J. RHODES
BY
ROBERT J. PATTERSON
ATTORNEY.

United States Patent Office 3,222,870
Patented Dec. 14, 1965

3,222,870
WAVE DAMPING APPARATUS
Henry F. Miller, Clifton, and Thomas J. Rhodes, Kinnelon, N.J., assignors to United States Rubber Company, New York, N.Y., a corporation of New Jersey
Filed Mar. 12, 1962, Ser. No. 178,842
6 Claims. (Cl. 61—5)

This invention relates to a device for the attenuation or damping of waves in liquids, such as waves which occur in oceans, lakes and other large bodies of water, and to a method of attenuating such waves. This invention has particular application to the attenuation of waves having a wave length much greater than the mean water depth, that is, to waves of long period.

Man has been interested in stilling ocean waves for generations. Today the desire to protect beaches against erosion by waves, the desire to protect man-made structures against wave damage, and the need for means to create artificial harbors increase the need for devices to calm waves.

A number of such devices have been heretofore proposed. Reference is made to the wave-damping blanket disclosed in U.S. patent application Serial No. 97,923, filed March 23, 1961.

Reference also is made to the apparatus described in Technical Memorandum No. 99, Beach Erosion Board, Corps of Engineers, "Model Tests on a Triple-Bulkhead Type of Floating Breakwater," dated September 1957. In this publication a triple bulkhead type of breakwater was disclosed which effected large reductions in wave height for waves with lengths shorter than the distance from front to back of the breakwater, but exhibited a rapid decrease in efficiency for longer waves, the reduction in wave height being only about 20 percent for waves twice as long as the breakwater. However, since the bulkheads were solid, the forces required to anchor and hold the structure made it impractical for stopping large waves. The report estimated the forces in certain of the anchoring cabes that would be caused by the larger waves as being between two and three million pounds and concluded that these stresses put the device beyond present practical design limits.

Reference is further made to the device heretofore proposed by us which was disclosed in U.S. patent application Serial No. 89,174, filed February 14, 1961, which application is hereby incorporated by reference in this application. The latter device, comprising float means buoyant in the liquid in which the wave is propagated and brake means spaced beneath the float means and provided with a plurality of valves to resist rising through the liquid when the brake means is pulled upward, is particularly well adapted to the attenuation of waves whose length is approximately equal to or less than the length of the wave-damping device itself.

However, the efficiency of the wave-damping device disclosed in the above-mentioned application Serial No. 89,174 is also low if the wave length substantially exceeds the length of the device. This condition exists for both deep-water waves ($\lambda/h \leq 2$) and shallow-water waves ($\lambda/h > 2$) but it becomes an increasingly serious problem with shallow-water waves. The result of this limitation is that the wave-damping system of application Serial No. 89,174 is limited in its usefulness to conditions where the waves are not more than 1.5 times the length of the device, and in many cases this condition is not the one which requires a wave reduction.

It is therefore an object of this invention to provide a novel wave-damping device.

A further object of our invention is to provide a wave-damping device which is efficient for waves having a large ratio of wave length to water depth, that is, a device which works efficiently on long period waves, i.e., "shallow water" waves, yet which does not generate enormous anchoring loads.

Another object is to provide a wave-damping device that is not only efficient for waves having a high ratio of wave length to mean water depth, but is also efficient for waves having relatively shorter wave length, i.e., so called "deep water" waves.

It is a further object of the present invention to provide a method for the attenuation of such waves.

Additional objects and advantages will become apparent hereinafter.

The foregoing objects are achieved by the use of a wave-damping device of special construction. The apparatus utilizes a vertical array of three or more baffles or valve sheets each of which is suspended in the liquid in which the waves are propagated. These baffles or valve sheets are arranged vertically in such a way as to trap and decelerate a large mass of water moving in a horizontally long elliptical orbit.

In accordance with our invention, each of the baffles is so designed that it will permit the passage of liquid, e.g., water, therethrough in one direction only. Each of these baffles is floatably vertically disposed in the liquid and is spaced apart from the other baffles, the face of each such baffle desirably being disposed transversely of the direction of wave movement. The baffle that is most "seaward," i.e., the farthest from the shore, is valved to permit passage of the liquid from the seaward side therethrough and toward the shore. Another baffle is valved in the opposite direction, that is, to permit passage of the liquid from the shore therethrough and out to sea. One or more additional baffles are also disposed "shoreward" of the most seaward valve sheet, as will be seen hereinafter.

We have found that for any two oppositely valved baffles of our wave-damping device, the distance between such baffles affects the attenuation attainable for waves of various wave lengths. Specifically, we have found that optimum attenuation is achieved for a given wave wherein the ratio of the distance between such oppositely valved baffles to the wave length of such wave is 0.65. The provision of one or more appropriately spaced additional baffles in our wave-damping device will effect optimum attenuation for other waves of other wave lengths, as will be more fully described hereinafter.

Where long-period shallow-water waves occur, i.e., wherein the ratio of wave length, $\lambda$, to mean water depth is very high ($\gg 1$), the orbital path of the water becomes highly elliptical, that is, it follows the shape of an ellipse whose major axis is horizontal. This results in a condition where the water is moving toward shore and away therefrom in an essentially horizontal pattern. As a result of this elliptical configuration, the water advances horizontally toward the shore at the crest of the wave and moves rapidly seawardly at a point ½ wave length away. The horizontal velocities within the wave at these two points are substantially the same but the motion of the water is in opposite directions.

By arranging at least three floatable vertical baffles or valve sheets in spaced relationship as previously defined, by connecting each such valve sheet to each adjacent sheet with substantially inextensible means, e.g., cords, cables, or the like, to form at least two zones, and by valving at least two zones, and by valving the seaward baffle shoreward, i.e., so that it permits liquid passage therethrough in a shoreward direction, and by valving the shoreward baffle seaward, i.e., so that it permits liquid passage therethrough in a seaward direction, it is possible to "trap" a large mass of water and to effectively reduce the wave amplitude, and to do this with a relatively small and inexpensive device.

It will be seen that our method of attenuating liquid waves of varying wave lengths comprises passing said waves through at least two zones disposed in the direction of movement of the waves, the length of one of such zones desirably being equal to about 65 percent of the wave length of the longest waves to be encountered, whereby a considerable reduction in wave amplitude is effected.

For a better understanding of the nature of this invention, reference may be had to the following detailed description when read in conjunction with the accompanying drawings, wherein:

FIG. 1 is a perspective view of one embodiment of the wave-damping device of our invention, which device comprises three baffles vertically disposed;

FIG. 2 is a partial elevational view of one of the vertical baffles;

FIG. 3 is a cross-sectional view along the line 3—3 of FIG. 2 and shows the panels in profile for our baffle sheet;

FIG. 3A is a profile view and shows an alternate construction of a panel;

FIG. 4 shows an alternate construction and is a partial elevational view of one of the vertical beffles wherein each panel is made up of overlapping components;

FIG. 8 is a schematic diagram showing suitable spacing of the baffles in our three-baffle wave-damping device;

FIG. 8A is a graph showing the theoretical reduction in wave height resulting from the three-baffle device of FIG. 8;

FIG. 9 is a schematic diagram showing suitable spacing for the baffles in a four-baffle wave-damping device;

FIG. 9A is a graph showing the theoretical reduction in wave height resulting from the four-baffle device of FIG. 9;

FIG. 10 is a schematic diagram showing suitable spacing for the baffles in a five-baffle wave-damping device;

FIG. 10A is a graph of the theoretical reduction resulting from the five-baffle device of FIG. 10;

Figure 5:
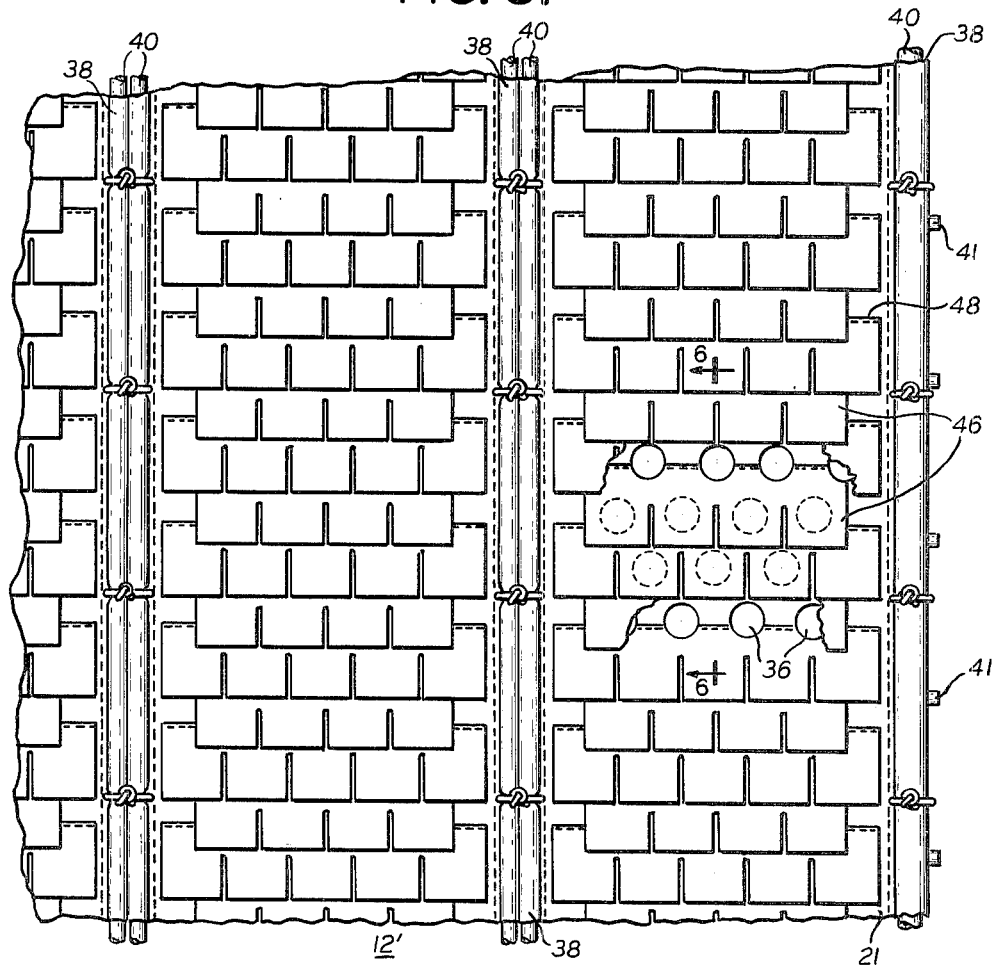
FIG. 5 shows another alternative construction and is a partial elevational view of one of the baffles wherein a plurality of holes are provided, with valve flaps for each hole.

The simplest embodiment of the instant invention is shown in FIG. 1 wherein our wave-damping device, generally designated by the reference numeral 10, comprises three vertical baffles or value sheets 12, 14 and 16, each shown floating in the water vertically by means of buoyant floats 18 attached to the tops of each. The three baffles 12, 14 and 16 are arranged in fixed spaced substantially parallel position relative to each other, generally by substantially inextensible cords 20 so that they are spaced apart from each other. While FIG. 1 shows the use of the cords 20 at only the tops and bottoms of baffles 12, 14 and 16, if desirable, as for instance to reduce the individual cord load, additional tie cords may be incorporated to join the baffles at intermediate points.

As shown in FIGS. 1–3, baffles 12, 14 and 16 are each made up of a plurality of rectangular panels or strips 22, each of which is pivotally mounted to a substantially rigid member 24, e.g., a tube, rod, or the like, extending transversely of the wave-damping device 10. Rigid members 25 extend from floats 18 to the lowest transverse rod 24 and provide junctures for fastening each such transverse rod 24 so as to define a "grid" type structure. For convenience in handling and transporting of our wave-damping device, rigid members 24 and 25 may, of course, be made up of a plurality of shorter members adapted to engage one another. Indeed, if desired, instead of using rigid members 24 and 25, substantially inextensible cords or cables can be substituted therefor.

Panel 22 may conveniently be made of a relatively rigid or stiff material, certain types of plastics being particularly suitable, e.g., plastic sheetings or moldings made up of "ABS polymer," e.g., a blend of rubbery butadiene-acrylonitrile copolymer with resinous styrene-acrylonitrile copolymer as disclosed in U.S. Patent 2,439,202, graft polymers formed by grafting styrene and acrylonitrile onto polybutadiene, etc.

Such panels 22 may be molded so as to have a cavity at the top thereof, through which cavity member 24 can extend. This method of securing panel 22 to member 24 ensures a freely pivoting action whereby the panel will readily respond to any water motion. In order to promote a prompt response, e.g., "snapping" action downward of the panel 22 after liquid has passed therethrough, there may be secured to the bottom (free) edge 32 of each such panel a weighted strip 34, e.g., a lead strip or the like.

Where the width of our wave-damping device is relatively great, the construction shown in FIG. 4 may be used, wherein several panel segments 26 are utilized rather than single panel 22. In this construction successive panel segments are alternately overlapped and underlappd so that the vertical edges 28 of a given panel segment 26 are overlapped by the edges 30 of adjacent panel segments 26', etc. Successive rows of panel segments can be staggered as shown.

In general, the baffles should offer, in their "open" position, a maximum possible void area to permit liquid passage therethrough so as to increase the over-all efficiency of our device and also to minimize the mooring load. From a consideration of FIGS. 1–3, it will be seen that when the panels of a baffle are displaced outward by the action of a wave, the void area approaches 100% since the only impediments to liquid flow are the members 24 on which the panels are mounted and the panel material disposed therearound. Accordingly, the efficiency of the system is virtually the optimum attainable. Since each panel 22 is itself a thin strip of substantially rigid material, it will readily hinge and pivot away from its vertical position when any force is exerted on it by a liquid pressing against it in a direction to swing or pivot the panel 22 away from the member 24 on which the lower (free) edge 32 of the panel rests and overlaps. However, when the liquid flows in the opposite direction, it forces the panel 22 to pivot downward to a vertical position such that its lower (free) edge overlaps and presses against member 24, so that when all the panels 22 are in such vertical position the baffle is closed.

Figure 6:
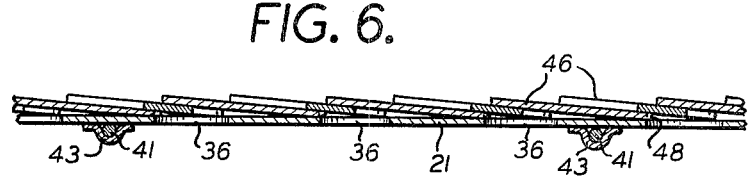
FIG. 6 is a cross-sectional view along the line 6—6 of FIG. 5.

In accordance with another embodiment of our invention, a baffle 12' may be substituted for paneled baffle 12. (Similarly constructed baffles can of course be substituted for paneled baffles 14 and 16.) Each such baffle 12' comprises a sheet 21 provided with a multiplicity of holes 36 therethrough. (FIGS. 5 and 6.) Preferably, the sheets 21 are made of segments of coated fabric of convenient length. At each side the perforated sheet 21 is folded over and secured, e.g., cemented, heat sealed, or stitched to itself, to form a pocket 38 in which is placed a member 40 which may be rigid, e.g., a rod, or flexible, e.g., a cord or the like. As shown in FIG. 5, the adjacent rods 40 in adjacent pockets 38 are butted and tied together.

In order to impart transverse reinforcement to the sheet 21, a plurality of rods 41 are mounted horizontally to the sheet so as to form a grid-type structure with rods 40. As shown in FIGS. 5 and 6, each such rod 41 passes through a pocket 43, and also is secured to rods 40.

Although the perforated baffle 12' is made from a material impervious to water, it is provided with a multiplicity of holes 36 therethrough, in order to enable the water to pass therethrough.

Additionally, means are attached to each baffle 12' to enable the baffle to restrict passage of water therethrough in one direction, but to permit the water to flow readily through each baffle in the opposite direction. These means may desirably comprise flapper strips 46 which are arranged to overlie holes 36 at least partially. In the embodiment illustrated in FIGS. 5 and 6, flapper strips 46 are narrow rectangular strips of coated fabric which cover holes 36 completely in a shingle-like fashion. Each flapper strip is attached along its upper edge 48, as by heat sealing, stitching, or the like to the perforated baffle, while the sides and the lower edge are left free.

Since the flapper strips 46 are themselves thin flexible sheets of coated fabric, they will hinge and bend away from the perforated baffle when any force is exerted on them by liquid passing through the holes in a direction that lifts the strips 46 away from the perforated sheets; when the liquid moves in the opposite direction, it will force the flapper strip 46 flat against the perforated sheets, thereby to close the holes therein. Thus, the thin flexible flapper strips 46 are each affixed along an upper edge 48 to the interior side of one of the baffles and are adapted to overlie the holes 36 therethrough when arranged flat against the sheet.

A float 18 is attached to the top of each of the baffles and thereby maintains the baffle in a vertical position, preferably the float comprises a series of buoyant elements 50. Any suitable floating means may be employed. For example, the buoyant element may simply be a large sealed container. Alternatively such buoyant element may be made of an imperforate unicellular, e.g., closed cell, expanded elastomer having a specific gravity less than one.

In order to maximize the void area presented by our wave-damping device, the depth of penetration of the float 18 below the surface of the water should be kept to a minimum. This is best attained by designing the float to cover a relatively large water surface area as shown in FIG. 1. The buoyancy provided by the float must be sufficiently great that the baffle supported thereby will "follow" the vertical wave displacement virtually instantaneously.

Means to anchor the vertical baffles are attached to each of buoyant elements 50 at the tops of the baffles. The anchoring means desirably comprises an array of tie ropes 52 fastened to anchors 54 set in the bottom.

As shown in FIG. 1, tie lines 52 are fastened to end baffles 12 and 16 at both the top and bottom thereof. Alternatively, the tie lines 52 may be fastened only to the end baffles at the top (water) surface. In the former instance it may be advisable to provide overload protection for our device, as will be shown. In contrast, with the latter construction, wherein tie lines 52 are secured only to the baffle tops and not to the bottoms thereof, no overload protection is necessary, for if an unexpected wave of huge energy is encountered, the lower edges of the end baffles 12 and 16 (FIG. 1) are each free to swing in the direction of the water motion whereby all three baffles can approach the horizontal and permit such wave to pass thereunder.

It will be appreciated that in oceans, lakes, or other large bodies of water, the variation in wave lengths encountered is great. In nature there is a statistical distribution of waves, e.g., long-period waves of irregular wave lengths coupled with short, sharp choppy waves superimposed upon them. It is for this reason that at least three valve sheets are mandatory in the wave-damping device of our invention.

Referring to FIG. 1, it will be seen that the panels 22 are so arranged that on the shoreward baffle 16 they close when the motion of the water is in the direction of the shore and open when the motion of the water is in the direction of the sea. The panels 22 attached to valve sheets 12 and 14 are so arranged that they open when the motion of the water is in the direction of the shore and close when the motion of the water is in the direction of the sea.

Figure 7:
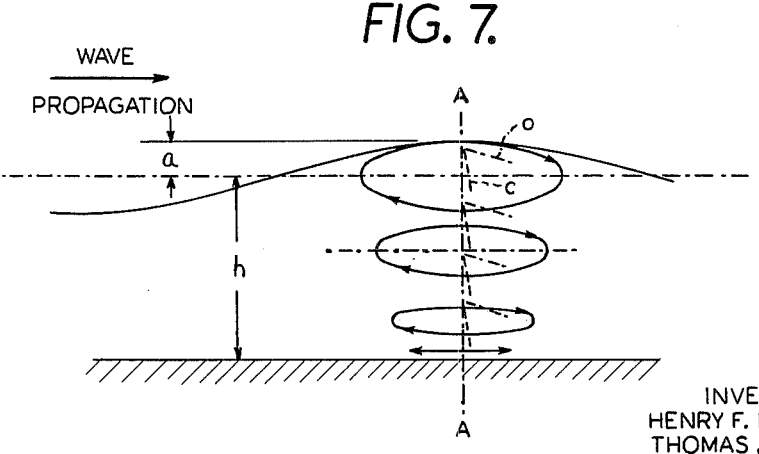
FIG. 7 is a schematic longitudinal cross-sectional view through a long-period wave.

Referring to FIG. 7, there is shown a schematic longitudinal cross-sectional view through a long-period wave. The ellipses represent the orbital paths described by individual particles at various depths. The wave energy is distributed through the entire water depth. As a result, particles at the bottom describe a linear path whereas particles of lesser depth describe elliptical paths. The paths of all particles within any particular vertical cross-section will describe confocal ellipses. During the time required for one complete wave length to pass a given vertical cross-section, e.g., section A—A, any individual particle will have traversed one complete elliptical orbit. Assuming that a baffle is located in the plane A—A and valved to open shoreward as shown by the dotted line, the panels will be wide open (position "O") when the crest passes through plane A—A, and will be completely closed (position "C") when the trough passes plane A—A (one-half wave length later).

Referring to the three-baffle wave-damping device shown in FIG. 1, as a wave crest passes through seaward panel 12 and intermediate baffle 14, it causes the panels 22 therein to open effortlessly. As the wave trough then proceeds through these two baffles the panels thereof will close. Since the amplitude, $a$, of the incident wave is always greater than the amplitude, $a_T$, of the transmitted wave, and since seaward baffle 12 and intermediate baffle 14 are valved shoreward, there is a greater seaward force developed than shoreward force and therefore our wave-damping device will have a greater tendency to move seaward than to move shoreward. Accordingly, the water contained within the device will have imposed on it an additional seaward acceleration. As a result of this action, a portion of the oscillatory energy associated with the incoming wave will be converted to a rectilinear flow seaward, with consequent reduction in wave amplitude.

In order to obtain optimum results, i.e., maximum reduction in wave amplitude, the distance baffles 12 and 16 is set equal to about 65 percent of the maximum wave length expected to be encountered. The inner or intermediate baffle 14 is placed between baffles 12 and 16, the particular spacing of such intermediate baffle preferably being such as to provide maximum damping for waves having wave lengths different from the maximum wave length expected. The determination of such spacing is discussed hereinafter.

The attenuation characteristics of our wave-damping device can be even further improved by the incorporation of additional baffles. The spacing of such additional sheets is based upon a consideration of the composite damping curve defined by the points of intersection of the theoretical damping curves for each zone defined by a pair of oppositely valved baffles, as will be seen.

The operation of the three-baffle wave-damping embodiment of our invention is best understood by a consideration of the following equation, which is derived from a consideration of the energy associated with a wave and the rate at which our baffle system can convert the oscillatory wave energy to rectilinear flow:

(1) $$\frac{a}{a_T} = \exp. \frac{2\pi X^2 d}{h\lambda^2} \sin^2\left[\frac{\pi X}{\lambda}\right]$$

wherein:

exp. = exponent of the base of natural logarithms = $e$
$a$ = incident wave amplitude
$a_T$ = transmitted wave amplitude
$\lambda$ = wave length in feet
$h$ = water depth in feet
$d$ = depth of valve sheet in feet, and
$X$ = the distance in feet between two oppositely valved baffles.

It will be seen that $a/a_T$ represents the ratio of the amplitudes of the incident and transmitted waves, that is, the attenuation, which attenuation results from the passage of the wave through our wave-damping device. It will further be evident that $a/a_T$ reaches a maximum when $x = 0.65\lambda$, that is, when the distance between oppositely valved baffles equals 65 percent of the wave length of the wave passing through our device. Accordingly, to effect maximum attenuation of the longest waves to be encountered, the distance between valve sheet 12 and valve sheet 16 (FIG. 1) should equal 65 percent of the wave length of such waves.

The theoretical damping curve for any given spacing between two oppositely valved baffles having a selected ratio of baffle depth to mean water depth, $d/h$, can be readily obtained by substituting in Equation 1 the values of various wave lengths to obtain the corresponding theoretical attenuation, $a/a_T$. The percent reduction in wave height is then given by the expression $(1-a_T/a)100$. (For situations wherein the wave length, $\lambda$, is less than the spacing X, between baffles, it is necessary to subtract the greatest number of whole wave lengths contained within such spacing, i.e., the ratio of $X/\lambda$ is always less than 1.)

Referring to FIGS 8 and 8A, there is shown in FIG. 8 a schematic diagram of our three baffle device. This device is designed to attenuate waves having a maximum wave length of 100 inches and also to attenuate all other waves having shorter wave lengths. Accordingly, the spacing, (X), between baffle 12 and batffle 16 was 65 inches (0.65×100 inches). The water depth, $h$, is 17 inches and the depth, $d$, of each baffle is 15.5 inches. The solid curve represents the theoretical attenuation, based on Equation 1, for waves passing through our wave-damping device and being attenuated by the action of only baffles 12 and 16. The dotted curve represents the theoretical attenuation in accordance with Equation 1 resulting from the action of baffles 14 and 16 on incident waves passing through our wave-damping device. It is important to note that the over-all attenuation obtainable from this three baffle wave-damping device is the crest line defined by the upper portions of the solid and the dotted curves.

An inspection of FIG. 8A reveals that the spacing of intermediate baffle 14 affects the lateral placement of the peaks of the dotted curve. That is, the peak attenuation characteristics induced by the intermediate baffle remain the same, but these peaks can be shifted either to the left or to the right depending upon the specific placement of the intermediate baffle 14 with respect to baffles 12 and 16. If this dotted curve is moved to the left then the slope (steepness) increases; conversely, if the curve is moved to the right, the slope decreases. As will be seen from FIG. 8, the intermediate baffle 14 is spaced 39 inches from the shoreward panel 16 and 26 inches from the seaward baffle 12, or in other words, this intermediate baffle is not quite half way between the shoreward and seaward baffles but rather, its distance from the shoreward baffle 16 constitutes 60 percent of the distance between the shoreward and seaward baffles. It will be noted from FIGS 8 and 8A that the specific baffle spacing selected yields a composite damping curve which predicts an optimum attenuation for waves of maximum wave length, 8.5 feet, and also predicts attenuation approaching the optimum for all shorter wave lengths.

Considering waves which have wave lengths less than the maximum wave length (100 inches in FIG. 8) yet which have relatively long wave lengths and which consequently exhibit an energy distribution which is relatively severe, it is obviously desirable to so position the intermediate baffle that the points of intersection of the damping curves yield as high an attenuation as possible for such waves. For example, in FIG. 8A the spacing of intermediate baffle 14 was selected such that the attenuation for waves having a wave length of about 6.8 feet was relatively high, i.e., 73 percent, for this relatively severe wave. This selection was also advantageous in that it resulted in a "valley" (about 63 percent attenuation) for milder waves of about 3.9 foot wave length, which waves exhibit a less severe energy distribution. This selection in spacing of intermediate baffle 14 was based upon a consideration of the points of intersection of the two damping curves (FIG. 8A). As previously pointed out, the advantages or such selection are that a relatively severe wave of 6.9 foot wave length will have a 73 percent attenuation while a milder wave of 3.8 foot wave length will have a 63 percent attenuation. In fact, it is only for a very short wave length of about 2.75 feet that there is a steep drop in attenuation, and this is not serious since the amount of energy associated with a wave of such short wave length is minimal. For wave lengths between 0 and 1.5 feet, the curves cycle very rapidly so that the attenuation in this entire region is at the peak value.

From the foregoing it will be evident that our three baffle wave-damping device is capable of effectively attenuating waves of widely varying wave lengths. It will be seen that the spacing of the baffles determines the "crest line," i.e., the line of demarcation between the shaded and unshaded areas. The crest line results from the superimposing of the damping curves for all pairs of oppositely valved baffles. The above procedure, wherein the spacings between the baffles are determined on the basis of the crest line can of course be used in adapting our wave-damping device to any particular situation, and will, of course, involve a consideration of the various factors discussed heretofore, e.g., wave length, wave height, water depth, depth of baffle, attenuation desired, etc.

We have found that the attenuation characteristics of our wave-damping device can be still further improved by the incorporation of one or more additional baffles. That is, if an intermediate baffle or sheet to form the three baffle wave-damping device of FIGS. 1 and 8 results in the improvement graphed in FIG. 8A, then additional baffles may further improve the wave-damping. A consideration of FIGS. 9 and 9A indicates that this is so. FIG. 9 is a schematic illustration of our wave-damping device, again adapted to attenuate waves having a maximum wave length of 100 inches. Accordingly, the distance X between the most seaward and most shoreward baffles 12 and 16 is maintained at 65 inches. The theoretical attenuation curve resulting from the action of baffles 12 and 16 is shown as a solid curve. Intermediate baffles 14 and 15 are disposed 46.8 inches and 33 inches, respectively, from shoreward baffle 16. The theoretical attenuation curves resulting from the action of baffles 14 and 16 is shown as a dash-dot (-.) curve and the theoretical attenuation resulting from the action of baffles 15 and 16 is shown as an even dash (- - -) curve. The improved attenuation characteristics for all waves is evident when comparing the crest line of the three curves of FIG. 9A with the crest line of the two curves of FIG. 8A. It will be noted that the spacing of intermediate baffles 14 and 15 (FIG. 9A) is not exactly one-third and two-thirds of the total distance between baffles 12 and 16. Rather, baffle 15 is spaced from baffle 16 at a distance of about 51 percent of the spacing between baffles 12 and 16; baffle 14 is spaced from baffle 16 a distance of about 72 percent of the total distance between baffles 12 and 16.

Referring now to FIGS. 10 and 10A, there is shown a schematic illustration of our wave-damping device, again adapted to attenuate waves having a maximum wave length of 100 inches. Thus, the distance X between the most seaward and most shoreward baffles 12 and 16 is maintained at 65 inches. The theoretical attenuation curve resulting from the action of these baffles is shown as the solid curve and is of course identical with the solid curves appearing in FIGS. 8A and 9A. Intermediate panels 13, 14 and 15 are disposed 50.7 inches, 42.9 inches, and 31.2 inches, respectively, from shoreward baffle 16. The theoretical attenuation curve resulting from the action of baffles 13 and 16 is shown as the even dash (- - -) curve; the theoretical attenuation curve resulting from the action of baffles 14 and 16 is shown as the dot-dash (.-) curve; and the attenuation curve resulting from the action of baffles 15 and 16 is shown as the dotted (...) curve. It will be seen that the crest line of these four curves reveals attenuation characteristics somewhat superior to those shown by the crest lines in either of FIGS. 8A and 9A. Naturally, our wave-damping device may comprise six, seven, or even a higher number of baffles. However, the incremental improvement arising from each additional baffle will continuously decrease, so that at some point further additions may not be practical.

Figure 11:
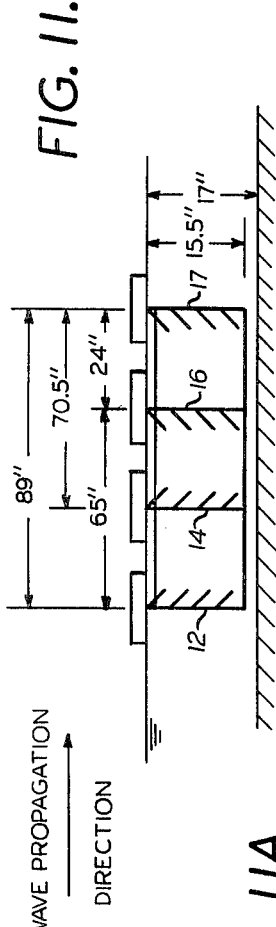
FIG. 11 is a schematic diagram showing another arrangement and respacing of the baffles in a four-baffle wave-damping device.
Figure 11A:
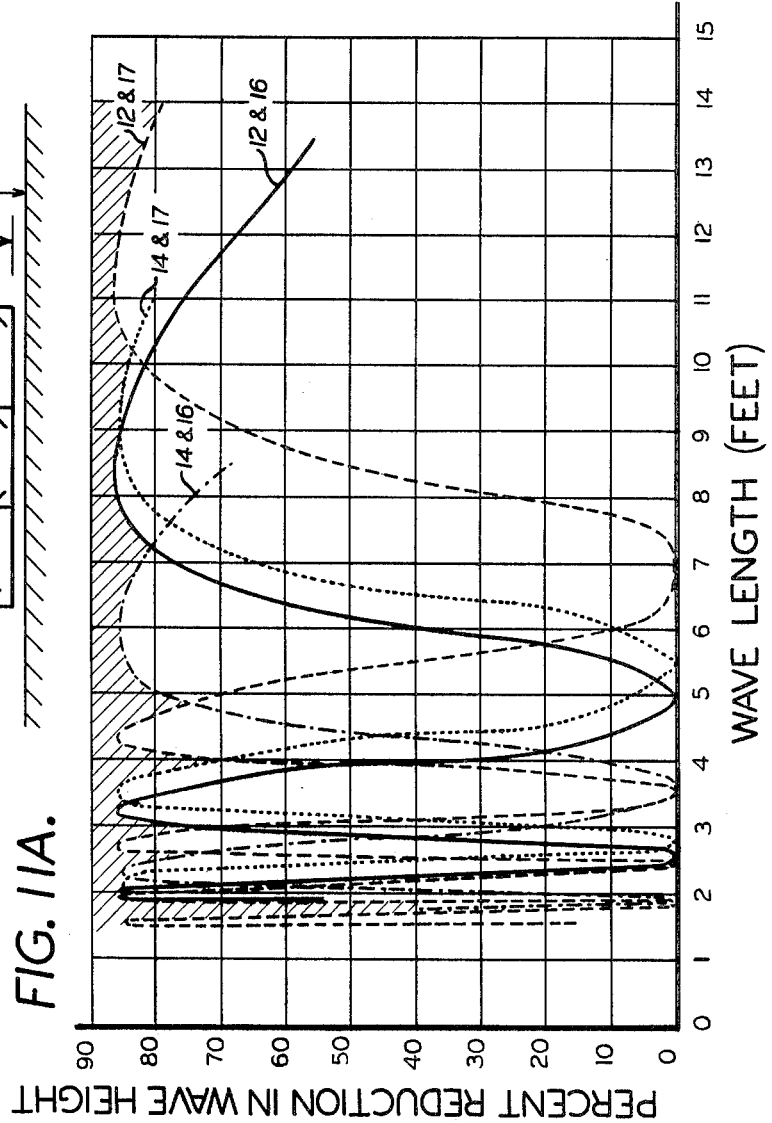
FIG. 11A is a graph of the theoretical reduction in wave height resulting from the four-baffle device of FIG. 11.

FIGS. 8–10 and 8A–10A each relate to a wave-damping device wherein all baffles except the shoreward baffle (valved seaward) are valved in the same direction. Our device may, however, be constructed wherein more than one baffle is valved seaward. FIGS. 11 and 11A illustrate one such construction. The wave-damping device is adapted to attenuate waves having a maximum wave length of 100 inches, so that the distance between one pair of oppositely valved baffles, namely baffles 12 and 16, is maintained at 65 inches. An intermediate baffle 14 is disposed between baffles 12 and 16 and is spaced 18.2 inches from baffle 12. This baffle 14 is valved shoreward as shown. In addition, an end baffle 17, which baffle is valved seaward, is disposed beyond baffle 16 and is spaced 24 inches therefrom. It will be seen that the distance between baffles 12 and 17 is 89 inches, or more than 65 percent of 100 inches, 100 inches being the expected maximum wave length. This spacing of such baffle 17 provides a safety factor in the event that waves having a wave length greater than 100 inches are actually encountered.

The theoretical attenuation curves resulting from the action of baffles 12 and 16 is shown as a solid curve and again is identical with the solid curves appearing in FIGS. 8A, 9A and 10A. The theoretical attenuation curve from baffles 12 and 17 is shown as the dashed curve (- - -); the theoretical attenuation curve from baffles 14 and 17 is shown as the dotted curve (...); and the theoretical attenuation curve from baffles 14 and 16 is shown as a dot-dash (.-) curve. It will be noted that the crest line defined by the portions of these four curves above their points of intersection reveals attenuation characteristics comparable to those shown by the crest line of FIG. 10A for a five-panel device. Further, the attenuation remains markedly high for waves having wave lengths in excess of the expected 100 inches, due to the action of baffle 17 in combination with baffle 14 (the dotted curve) and also in combination with baffle 12 (the dashed curve).

A further advantage of the embodiment of our wave-damping device shown in FIG. 11 relates to a reduction in mooring loads. That is, considering the zone between end baffles 12 and 17 wherein the distance therebetween is 89 inches, it will be apparent that such zone will accommodate a greater volume of water than the zone between baffles 12 and 16 (FIGS. 8–11) wherein the distance therebetween is 65 inches. Accordingly, a greater force will be required to accelerate seaward such volume of water (between baffles 12 and 17, FIG. 11) than would be required to accelerate the relatively smaller but maximum volume of water between baffles 12 and 16 (FIGS. 8–10); in other words, the greater the volume of water to be accelerated seaward, the lower is the magnitude of the shoreward mooring force required to withstand the resultant seaward force developed by our wave-damping device. When properly moored, the trap should have some horizontal freedom. (The normal catenary sag in the mooring lines will probably be sufficient.) The trap will thus oscillate horizontally due to the passage of the waves therethrough and not build up a severe anchor load.

Figure 12:
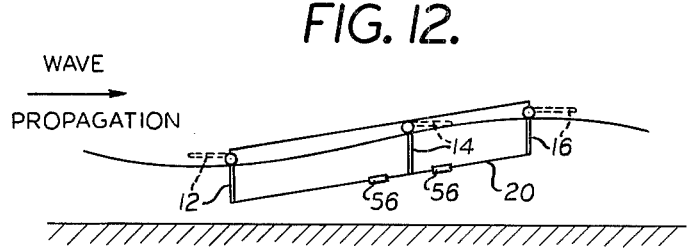
FIG. 12 is a schematic longitudinal cross-sectional view through one embodiment of our wave-damping device and illustrates the position of an overload release mechanism.

In certain instances it is desirable to provide our vertical wave-damping device with automatic overload protection. For example, when the seaward and shoreward baffles 12 and 16 (FIG. 1) are anchored both at their tops and bottoms via tie lines 52, overload protection is conveniently achieved, as shown in FIG. 12, by means of pull-out units 56 on those lines 20 attached to the lower ends of the valve sheets 12, 14 and 16. With this arrangement the anchors are always protected against overload, since excessive pressure on the sheets will trigger pull-out units 56, thereby to release lower lines 20 and permit baffles 12, 14 and 16 to move to the surface of the water (to the position shown by the dotted lines) where the forces are greatly reduced.

Apart from the above mentioned overload protection system, our wave-damping device is also self-regulating in terms of the maximum stress which can be applied to the baffles by the water. In the normal operation of our device, the stress on the vertical baffles and the lines joining them is a function of the geometry of the wave and depends partly, in the case of shallow-water waves, on the height or amplitude $a$ and the depth of the sheets. Thus, the forces on the apparatus can be limited by adjusting the baffles for depth. Further, as previously pointed out, in the case of waves of abnormal length, the system is self-regulating by virtue of the type of anchoring system used. Thus, if anchors 54 and tie lines 52 are attached only to the tops of the end baffles, the lower ends of the baffles can swing in the direction of the water motion in the case of abnormally long waves. This free-swinging principle prevents abnormally high loads on anchors 54. The free swinging principle also provides for self-regulation of our device under normal wave conditions. Thus, should certain wave length combinations result in a mass of water impinging on the seaward baffle at a velocity considerably higher than the oppositely acting velocities on the shoreward baffles, all of the baffles will tend to swing temporarily off the vertical position and thus avoid overload.

Our apparatus is designed primarily for waves moving at right angles to the planes of the baffles and thus is not effective against waves moving parallel thereto. This is not a severve limitation, however, since in most cases our device can be arranged perpendicular to the direction of the wave motion. Such is invariably the case with shallow water waves, since the direction of a long period wave front is changed as it moves obliquely towards shore. It tends gradually to turn and parallel the shore line. In case a multiple directional system is required, such system can readily be obtained by anchoring a number of our vertical wave-damping devices at different angles, or else by anchoring one system as shown in FIG. 13.

Figure 13:
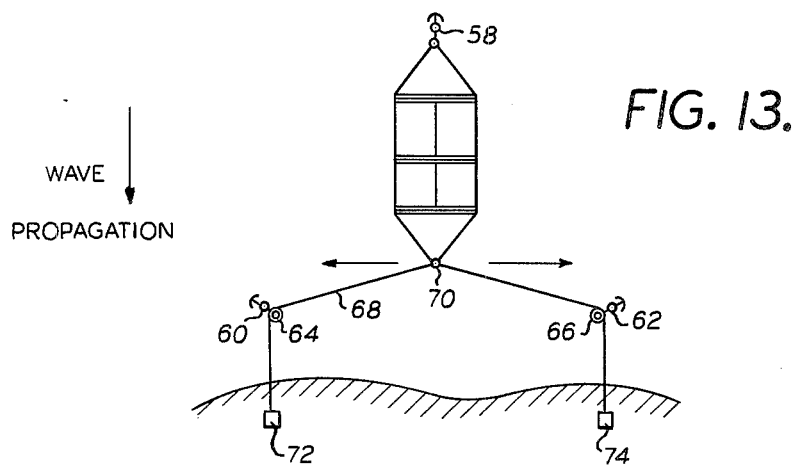
FIG. 13 is a plan view of a means of controlling the position of our wave-damping device.

In FIG. 13 our wave-damping device is anchored at points 58, 60 and 62 as shown. Pulleys 64 and 66 are positioned at anchors 60 and 62, respectively. A cable 68 is attached to the device at 70 and passes around pulley 64, terminating at a take-up and let-off device 72. Cable 68 passes around pulley 66, being attached also at point 70 and terminates at a take-up and let-off device 74, as shown. This arrangement permits our wave-damping device to swing so that it can orient itself in any direction within a 90 degree range. Thus the vertical panels 12, 14 and 16 can always be maintained in a direction perpendicular to that of the oncoming waves.

The following examples will further illustrate our invention.

EXAMPLE 1

A three-baffle wave-damping device similar to that shown in FIG. 8 was constructed. Each of baffles 12, 14 and 16 contained four panels 22 made of relatively rigid plastic ("Royalite"). Each panel was 16½ inches wide, 3½ inches deep, and 1/16 inch thick. The four panels for a given baffle were mounted on stainless steel rods 24 as shown in FIG. 3. Each such rod 24 was connected at the ends thereof to vertical rods 25 (FIG. 1). The rods 24 were spaced 3¼ inches from each other so that each panel pivotally mounted on one such rod would, when vertical, have its lower side abut and rest against the next lower rod 24. The total depth of each baffle was 13 inches. Each baffle was fastened at the top thereof to a rectangular float made of "Ensolite" brand expanded elastomer. Each float was 18 inches long, 16½ inches wide, and 3 inches deep. To the lower edge of each panel was secured a thin (1/10 inch) strip of lead, whereby to cause the baffles to float vertically and also to promote a prompt "snapping" action of the panel.

The three baffles were connected together by stainless steel wires so arranged as to maintain the end baffles 65 inches apart. The "seaward" baffle 12 was disposed somewhat differently than as shown in FIG. 8 in that the distance between baffle 12 and intermediate baffle 14 was 32 inches, and the distance between baffle 14 and shoreward baffle 16 was 33 inches.

The wave channel, in which our three baffle device was used consisted of a transparent, steel reinforced basin 30 feet in length, 27 inches deep and 18 inches wide. The far wall of the channel was marked with a grid system having one inch horizontal spacings and one foot vertical spacings. The water depth in the channel was maintained at 15 inches. Waves were generated by a bottom-hinged, flat plate wave generator driven by an air cylinder. The flat plate wave generator was 17¾ inches wide and 32 inches deep, so that the top thereof extended above the channel. Wave conditions could be altered by means of a pressure regulator, flow control valves and proximity switches (not shown). Permanent wave absorbers made of Trilok (see U.S. Patent Re. 24,007) were located at each end of the channel to minimize wave reflections from the ends of the channel.

The wave-damping device was held in position by wires 52 attached to the four corners of the seaward and shoreward valve baffles 12 and 16. Light springs were used in each line to simulate the elasticity of the mooring system.

By appropriate adjustment of the proximity switches, waves of various wave lengths were generated and the incident and transmitted wave amplitudes were recorded. The results are given in Table I.

*Table I*

| Run No. | Wave length ($\lambda$), feet | Incident wave height ($2a$), inches | Transmitted wave height ($2a_T$), inches | Experimental attenuation, percent | Theoretical attenuation, percent |
|---|---|---|---|---|---|
| 1 | 2.5 | 3.00 | 0.39 | 87.0 | 39.0 |
| 2 | 3.0 | 4.00 | 0.60 | 85.0 | 83.0 |
| 3 | 3.5 | 5.00 | 0.80 | 84.0 | 80.0 |
| 4 | 4.0 | 5.00 | 0.60 | 88.0 | 83.0 |
| 5 | 4.5 | 5.00 | 0.65 | 87.0 | 82.5 |
| 6 | 5.0 | 4.00 | 0.58 | 85.5 | 79.5 |
| 7 | 5.5 | 5.75 | 0.86 | 85.0 | 74.0 |
| 8 | 6.0 | 5.25 | 1.00 | 81.0 | 70.0 |
| 9 | 6.5 | 5.00 | 1.05 | 79.0 | 63.0 |
| 10 | 7.0 | 4.50 | 0.79 | 82.5 | 75.0 |
| 11 | 7.5 | 3.50 | 0.58 | 83.5 | 81.5 |
| 12 | 8.0 | 3.50 | 0.59 | 83.0 | 83.0 |
| 13 | 8.5 | 4.00 | 0.80 | 80.0 | 82.0 |
| 14 | 9.0 | 4.00 | 0.96 | 76.0 | 81.0 |

EXAMPLE 2

The same arrangement was used as described in Example 1; however, an input of waves having random wave lengths varying from 2.5 to 9.0 feet was obtained by merely moving the position of the proximity switches completely at random. Accordingly, the wave-damping device was continuously subjected to the action of waves of random wave length, thereby simulating conditions in a large body of water. Because of the random input precise measurements of incident and transmitted wave heights could not be made. However, the attenuation obtained appeared qualitatively to be of the same order of magnitude as the attenuation obtained in the preceding example, i.e., invariably the attenuation was about 80 percent or higher.

EXAMPLE 3

Instead of the three-baffle device described in Example 1, a four-baffle device was used. Each baffle was constructed as described in Example 1. The arrangement was similar to that shown in FIG. 11 in that two "seaward" baffles 12 and 14 were valved shoreward and the shoreward baffles 16 and 17 were valved seaward. However, the spacing between the baffles was somewhat different from that shown in FIG. 11. Thus, baffle 12 was 32 inches from baffle 14; baffle 14, 33 inches from baffle 16; and baffle 17, 24 inches from baffle 16. Otherwise, the conditions were the same as in Example 1. The results obtained are given in Table II.

*Table II*

| Run No. | Wave length ($\lambda$), feet | Incident wave height ($2a$), inches | Transmitted wave height ($2a_T$), inches | Experimental attenuation, percent | Theoretical attenuation, percent |
|---|---|---|---|---|---|
| 1 | 2.5 | 3.00 | 0.27 | 91.0 | 84.0 |
| 2 | 3.0 | 4.50 | 0.40 | 91.0 | 84.0 |
| 3 | 3.5 | 4.00 | 0.48 | 88.0 | 84.0 |
| 4 | 4.0 | 4.25 | 0.38 | 91.0 | 86.0 |
| 5 | 4.5 | 4.00 | 0.42 | 89.5 | 86.0 |
| 6 | 5.0 | 5.00 | 0.65 | 87.0 | 82.5 |
| 7 | 5.5 | 5.25 | 0.53 | 90.0 | 78.0 |
| 8 | 6.0 | 5.00 | 0.85 | 83.0 | 75.0 |
| 9 | 6.5 | 4.25 | 0.57 | 86.5 | 83.0 |
| 10 | 7.0 | 4.00 | 0.56 | 86.0 | 86.0 |
| 11 | 7.5 | 4.00 | 0.56 | 86.0 | 86.0 |
| 12 | 8.0 | 4.00 | 0.56 | 86.0 | 86.0 |
| 13 | 8.5 | 3.25 | 0.51 | 84.5 | 86.0 |
| 14 | 9.0 | 4.25 | 0.72 | 83.0 | 85.0 |

It will be noted that the excellent attenuation results obtained for our four-baffle wave-damping device actually exceed those obtained in Example 1 for the three-baffle device. (This is also predicted by the theoretical calculations.)

EXAMPLE 4

Using the four-baffle device of Example 3, the wave input was varied in a random fashion as described in Example 2. Attenuations of 80 percent or greater were consistently obtained.

The beach area protected by a wave-damping device of a given over-all baffle width may be effectively increased by having the extremities of said device inclined at an angle toward the shore. Alternatively, additional, narrower wave-damping devices can be disposed contiguous to or near the lateral extremities of the main wave-damping device and at an angle thereto inclining toward the shore. In either case, such arrangement brings the lateral extremities nearer to the shore, thus shortening the distance between the shore and the points at which waves are refracted around the device and hence widening the protected area. In deep-water installations of the wave trap, sections of the trap may be arranged in a polygon surrounding the area to be protected.

From the foregoing it will be apparent that our wave-damping device can be utilized in a wide variety of applications. For example, it may be used at beaches, sailing marinas, off-shore oil rigs, Texas towers, etc. The capacity of our wave-damping device to attenuate waves of widely varying wave lengths renders it readily adaptable to virtually any water condition.

Variations can, of course, be made without departing from the spirit of our invention.

Having thus described our invention, what we desire to secure and claim by Letters Patent is:

1. A device for attenuating the amplitude of incident waves in a liquid passing therethrough comprising two end baffles and at least one intermediate baffle therebetween, said baffles being disposed perpendicular to the direction of wave propagation of said incident waves and being maintained in substantially parallel planes and spaced apart from each other in the direction of wave propagation by inextensible and flexible spacing means connecting the top of each of said baffles to the next adjacent baffle and by inextensible and flexible mooring means attached between each of said end baffles and fixed anchoring devices, said mooring means having normal catenary sag to allow said baffles to oscillate horizontally, said anchoring devices being at the end of each of said mooring means, float means at the top of each of said baffles from which said baffles are supported and depend vertically into said liquid, each of said baffles having a plurality of openings at different levels in substantially the same plane with pivotally mounted closure means over each of said openings, each of said closure means being larger than each of said openings and swingable in the same direction from horizontal pivot means to uncover the openings thereby permitting flow of liquid in one direction only, said end baffles having said pivotally mounting closure means swingably mounted in opposite directions to uncover the openings thereof, said end baffle nearest to the oncoming wave and the next adjacent baffle having said pivotally mounted closure means swingably mounted in a direction towards the other of the end baffles to uncover the openings and thereby to permit liquid to flow therethrough in the direction of wave propagation.

2. The device of claim 1 comprising additional inextensible and flexible spacing means connecting the bottom of each of said baffles with the bottom of the next adjacent baffle.

3. The device of claim 2 comprising pullout units, between each of said baffles, in the spacing means connecting the bottom of said baffles to permit said baffles to swing freely when said device is overloaded.

4. The device of claim 1, wherein a second intermediate baffle is disposed between said end baffles and parallel thereto and with its top connected by said spacing means to adjacent baffles in the same manner as said one intermediate baffle.

5. The device of claim 4, in which said second intermediate baffle has its closure means swingable in the same direction to uncover the openings as said first intermediate baffle.

6. The device of claim 4, wherein each end baffle and the intermediate baffle adjacent thereto have their closure means swingable in the same direction to uncover the openings.

References Cited by the Examiner
UNITED STATES PATENTS

| | | | |
|---|---|---|---|
| 325,127 | 8/1885 | Spangler | 61—4 |
| 436,644 | 9/1890 | White | 61—5 |
| 1,080,049 | 12/1913 | Dean | 61—4 |
| 2,185,458 | 1/1940 | Giliasso | 61—5 |
| 2,388,171 | 10/1945 | McVitty | 61—1 X |
| 2,655,790 | 10/1953 | Daley | 61—3 |
| 2,658,350 | 11/1953 | Magill | 61—5 |
| 2,710,505 | 6/1955 | Magill | 61—4 |
| 3,011,316 | 12/1961 | Wilson | 61—4 |

FOREIGN PATENTS

| | | |
|---|---|---|
| 1,203 | 1860 | Great Britain. |
| 1,804 | 1870 | Great Britain. |

OTHER REFERENCES

Plastics: pp. 18 and 21; April 1947.

CHARLES E. O'CONNELL, *Primary Examiner.*

EARL J. WITMER, BENJAMIN BENDETT, *Examiners.*